April 29, 1958 — G. R. RYAN — 2,832,338
VENOCLYSIS APPARATUS
Filed Oct. 7, 1954

Inventor
George R. Ryan
By William E. Dominick
Attorney

United States Patent Office 2,832,338
Patented Apr. 29, 1958

2,832,338

VENOCLYSIS APPARATUS

George R. Ryan, Waukegan, Ill., assignor to Abbott Laboratories, North Chicago, Ill., a corporation of Illinois Application October 7, 1954, Serial No. 460,818

3 Claims. (Cl. 128—214)

The present invention relates to venoclysis apparatus and more particularly to an improved flexible tube sealer useful in the administration of medicaments.

During the administration of parenteral fluids, such as physiological salt solution, it frequently becomes necessary to supplement the parenteral fluid with a medicament, such as epinephrine, which is normally administered to the patient intramuscularly by means of a hypodermic needle. Where a more rapid response is desired or where it is advisable to avoid further disturbing the patient by directly injecting with a hypodermic needle, it becomes desirable to inject the supplementary medicament into a portion of the tubing conveying the parenteral fluid. As the tubing used for administering parenteral fluids consists largely of flexible plastic tubing which does not readily reseal after being penetrated by a hypodermic needle, it is the present practice to interpose a length of readily resealing natural latex rubber tubing between the end of the flexible plastic tubing and the administration needle or needle adapter therefor.

In order to provide a plastic tubing with the section of latex tubing it has heretofore often been necessary to insert a plastic adapter into the end of the plastic tubing for engagement with one end of the latex tubing and a plastic needle adapter into the opposite end of the latex tubing. There is considerable difficulty, however, in assembling the foregoing latex tubing structure and there is also considerable danger that in operation the hypodermic needle will be penetrated through both walls of the flexible section of latex rubber tubing. A further disadvantage of the present latex tubing structure is that the said tubing is disposed directly adjacent the administration needle and it is difficult to inject the medicament into the interior of the section of latex tubing without disturbing the administration needle in the patient's body. Moreover, when the latex tubing which is punctured by a hypodermic needle is placed under tension as by bending, the slit in the tubing made by the hypodermic needle frequently opens allowing the parenteral fluid to leak out onto the body of the patient.

It is therefore an object of the present invention to provide an improved tube sealer which can be more conveniently and economically assembled.

It is a further object of the invention to provide an improved tube sealer which can be conveniently disposed at any point along the length of a flexible plastic tubing used for administering venocylsis fluids.

It is a still further object of the invention to provide an improved tube sealed which can only be penetrated through one wall thereof, thereby reducing the danger of injury to patient or operator.

It is also an object of the present invention to provide an improved tube sealer having a rigid body section which will immobilize the tubing making it more conveniently punctured with a hypodermic needle and reducing the possibility of leakage of fluid.

Other objects of the invention will be apparent from the detailed description and claims to follow.

The foregoing objects and other advantages of the present invention will be readily appreciated by reference to the following detailed description when considered in conjunction with the accompanying drawing showing one embodiment of the invention wherein.

Figure 1:
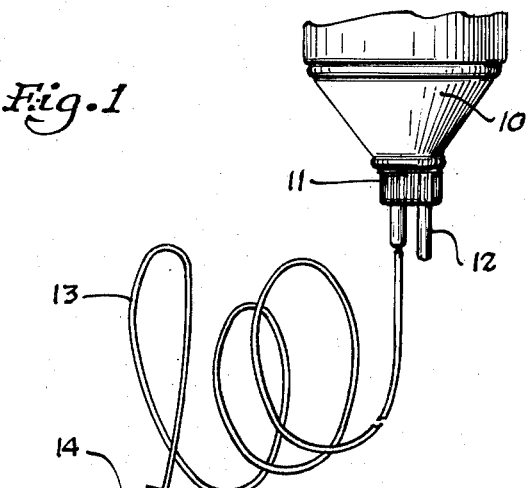
Figure 1 is a side elevation view showing the improved tube sealer operatively associated with a venoclysis fluid container, a length of flexible tubing, and an administration needle.

Referring to the drawing, there is shown in Figure 1 a venoclysis fluid container 10 having a closure cap member 11 secured to the discharge outlet thereof with an air filter 12 and flexible plastic tubing 13, 13' communicating with the interior of the fluid container 10. Intermediate the ends of the flexible tubing 13, 13' is the improved tube sealer designated generally by 14 having one end secured to the flexible tubing 13 communicating with the venoclysis container and the other end secured to the flexible tubing 13' associated with the administration needle 15. Where a relatively small diameter flexible plastic tubing is used, it is generally preferable to insert the tubing into the end of the tube sealer, and when a relatively large diameter flexible plastic tubing is used, the tubing is preferably inserted over the ends of the tube sealer or over the outwardly projecting smaller diameter end sections thereof.

Figure 2:
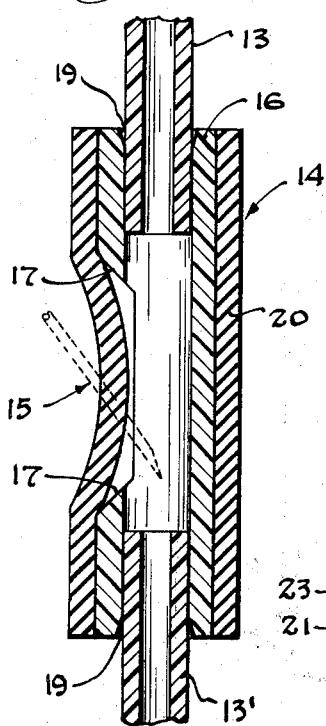
Figure 2 is a vertical sectional view of the improved tube sealer shown in Figure 1.
Figure 3:
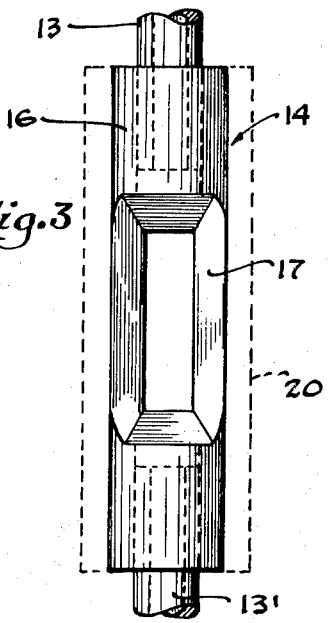
Figure 3 is a top plan view of the rigid tubing employed in the tube sealer shown in Figure 2.

Referring more particularly to Figure 2 of the drawing showing the enlarged sectional view of the improved tube sealer 14, a section of substantially rigid plastic tubing 16 provided with an opening 17 intermediate the ends thereof in a lateral surface providing unobstructed access into the interior of the rigid tube 16, said opening 17 having a width sufficient to permit the insertion of a hypodermic needle or the like therethrough, is secured in telescoping relationship to the end of the flexible plastic tubing 13, preferably by a solvent seal. The opposite end of the rigid tube 16 also is secured in telescoping relationship, preferably by means of a solvent seal, to the length of flexible plastic tubing 13'. To facilitate the telescoping of the flexible plastic tubing with the ends of the rigid tube 16, each end is preferably provided with a tapered section 19. A sealing closure over the opening 17 in the wall of rigid tube 16 is provided by means of a section of resealable tubing 20, preferably latex rubber tubing, of substantially the same length as the rigid tube 16 fitted over the said rigid tube 16 without, however, imposing any appreciable longitudinal force on the tubing 20 which would tend to stretch the said tubing. The tubing 20 has a diameter such that it fits tightly about the rigid tube 16 and remains in place thereon having no tendency to slide longitudinally or laterally on the said rigid tubing 16. The tubing 20 has a wall thickness sufficient to readily reseal after being penetrated by a hypodermic or similar needle.

Figure 4:
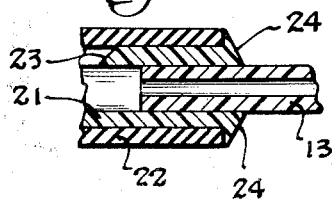
Figure 4 is a fragmentary vertical sectional view of one end of a modified form of the tube sealer.

In the modified form of the tube sealer shown in Figure 4 of the drawing, the rigid section of plastic tube 21 is provided at each end thereof with a laterally extending flange section 24 which engages the end surfaces of the section of latex rubber tubing 22 disposed thereabout exerting a restraining or compressing force on the ends of the latex rubber tubing 22. The rigid tube 21 is in all other respects the same as rigid tube 16 shown in Figure 2 of the drawing and has provided in one lateral surface thereof an opening 23 through which a hypodermic needle is insertable into the interior of the said rigid tube 21 through the wall of the rubber latex tubing 22. By employing the modified structure of the rigid tube shown in Figure 4 and by selecting a latex rubber tubing having a length longer than the length of the rigid tube 21 so that a compressing force is exerted upon the rubber latex tubing 22 when in position on the rigid tube 21, it is possible to obtain better resealing properties with the rubber latex tubing 23 and makes it possible to employ a latex tubing having a thinner lateral wall section than otherwise possible.

In practice, the section of rigid tube having the opening in one lateral surface thereof is provided with the section of rubber latex tubing prior to forming a sealing engagement with the flexible tubing disposed in each end thereof, although it is possible where desired to secure one or both ends of the rigid tube to the flexible tubing prior to disposing the section of latex rubber tubing about the exterior of the said rigid tube.

When it is desired to administer a medicament to a patient receiving a parenteral fluid with venoclysis apparatus including the improved tube sealer of the present invention, the attendant simply grasps the rigid tube sealer 14 with one hand and inserts the hypodermic needle through one wall of the rubber latex tubing 20 into the interior of the rigid tube 16 through the lateral opening 17 thereof, said opening being readily discernible from the reduced diameter section formed over the opening 17 in the wall of the rigid tube 16 due to the tendency of the natural latex tubing to conform to the reduced diameter of the rigid tube 16.

Since a substantial proportion of the flexible plastic tubing employed in administering parenteral fluids consists of flexible vinyl tubing, it is preferable to have the rigid tube 16 formed of rigid vinyl plastic, thereby enabling the flexible tubing to be solvent sealed to the rigid tube 16. It should be understood, however, that other plastic material can also be used to form the rigid tube 16, such as nylon, polyvinyl, styrene or the like. And, while it is preferred to solvent seal the flexible tubing to the section of rigid tube, it is also possible, if desired, to secure the tubing to the rigid tube by means of a heat seal, an adhesive, or a friction fit.

Others may readily adapt the invention for use under various conditions of service, by employing one or more of the novel features disclosed or equivalents thereof. As at present advised with respect to the apparent scope of my invention, I desire to claim the following subject matter.

I claim:

1. A venoclysis apparatus which comprises a substantially rigid tubular section having a passage extending longitudinally therethrough with inlet and outlet sections at opposite ends thereof, a length of small diameter plastic tubing extending into each of said inlet and outlet sections adapted to telescopically engaging and forming a sealing engagement with said inlet and outlet sections, said tubular section having a lateral opening intermediate the ends thereof suitable for introducing a hypodermic type needle therethrough and being solvent sealable to the flexible plastic tubing, and a section of resealable tubing fitted over the said rigid section to seal the lateral opening therein, said resealable tubing being yieldable to permit penetration by a hypodermic type needle and capable of completely resealing after the said needle is withdrawn; whereby a substance can be conveniently and safely introduced into the said passage through the lateral openings of the rigid tubular section.

2. A self-sealing tube fitting which comprises a substantially rigid tubular section having a passage extending longitudinally therethrough with inlet and outlet sections at opposite ends thereof, said inlet and outlet sections adapted to telescopically receiving and forming a sealing engagement with a length of flexible plastic tubing, said tubular section having a laterally extending retaining flange adjacent the said opposite ends thereof and having a lateral opening intermediate the retaining flanges suitable for introducing a hypodermic type needle therethrough, and a section of resealable tubing fitted over the said rigid section and having the ends thereof engaging the said retaining flanges, said resealable tubing being yieldable to permit penetration by a hypodermic type needle and capable of completely resealing after the said needle is withdrawn; whereby a substance can be conveniently and safely introduced into the said passage through the lateral opening of the rigid body section.

3. A venoclysis apparatus comprising a length of flexible plastic tubing having interposed between the ends thereof a self-sealing fitting; said fitting comprising a substantially rigid tubular section having a passage extending longitudinally therethrough with inlet and outlet sections at opposite ends thereof, said inlet and outlet sections adapted to telescopically receiving and forming a sealing engagement with a length of flexible plastic tubing, said tubular section having a laterally extending retaining flange at the said opposite ends thereof and having a lateral opening intermediate the retaining flanges suitable for introducing a hypodermic type needle therethrough, and a section of resealable tubing fitted over the said rigid section and having each end thereof engaging one of said retaining flanges, said resealable tubing being yieldable to permit penetration by a hypodermic type needle and capable of completely resealing after the said needle is withdrawn; whereby a substance can be conveniently and safely introduced into the said passage through the lateral opening of the rigid body section.

References Cited in the file of this patent

UNITED STATES PATENTS 2,346,334    Shaw _____ Apr. 11, 1944